United States Patent
Tallapragada et al.

(10) Patent No.: US 11,390,236 B2
(45) Date of Patent: Jul. 19, 2022

(54) OPEN FRAME VEHICLE SIDE OCCUPANT RESTRAINT SYSTEM

(71) Applicant: FORD GLOBAL TECHNOLOGIES, LLC, Dearborn, MI (US)

(72) Inventors: Srivardhan Tallapragada, Royal Oak, MI (US); Jay Douglas Blackson, Dryden, MI (US); Pamela Avendano arenas, Ypsilanti, MI (US); Aleksandar Spasovski, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/126,146

(22) Filed: Dec. 18, 2020

(65) Prior Publication Data
US 2022/0194312 A1    Jun. 23, 2022

(51) Int. Cl.
*B60R 21/213* (2011.01)
*B60R 13/02* (2006.01)
(Continued)

(52) U.S. Cl.
CPC .......... *B60R 21/213* (2013.01); *B60R 13/025* (2013.01); *B60R 13/0206* (2013.01);
(Continued)

(58) Field of Classification Search
CPC ... B60R 21/213; B60R 21/04; B60R 21/2165; B60R 21/232; B60R 13/0206;
(Continued)

(56) References Cited

U.S. PATENT DOCUMENTS 6,341,796 B1  1/2002  Preisler
6,457,738 B1  10/2002  Labrie et al.
(Continued)

FOREIGN PATENT DOCUMENTS

DE       10105716      9/2001
DE     102014013582    4/2015
(Continued)

OTHER PUBLICATIONS

Beer, Bernhard. Machine Translation of EP 0857624 A1 Obtained Nov. 22, 2021. Aug. 12, 1998. Entire Document. (Year: 1998).*

*Primary Examiner* — Jonathan Ng
*Assistant Examiner* — Scott F. Underwood
(74) *Attorney, Agent, or Firm* — Vichit Chea; Price Heneveld LLP

(57) ABSTRACT

A roof rail assembly for a motor vehicle having an open frame vehicle architecture includes a side air curtain fixedly coupled with a sports tube via a first fastener oriented at a first angle relative a horizontal transverse plane of the sports tube. A roof rail trim cover is coupled with the sports tube via a second fastener oriented at a second angle, wherein the first angle and the second angle are not parallel. A cover member depends from the roof rail trim cover and includes a plurality of parallel hinges integrally molded into the cover member. A releasable opening is disposed parallel to the plurality of parallel hinges. Activation of the side air curtain rotates the cover member about the plurality of parallel hinges to open the releasable opening to allow passage of side air curtain through an opening.

17 Claims, 11 Drawing Sheets

(51) Int. Cl.
*B60R 21/2165* (2011.01)
*B60R 21/04* (2006.01)
*B60R 21/232* (2011.01)
*B60R 21/231* (2011.01)

(52) U.S. Cl.
CPC .......... *B60R 21/04* (2013.01); *B60R 21/2165* (2013.01); *B60R 21/232* (2013.01); *B60R 2021/0442* (2013.01); *B60R 2021/23192* (2013.01)

(58) Field of Classification Search
CPC .......... B60R 13/025; B60R 2021/0442; B60R 2021/23192
See application file for complete search history.

(56) References Cited

U.S. PATENT DOCUMENTS

| | | | |
|---|---|---|---|
| 6,616,182 B2 | 9/2003 | Woolley et al. | |
| 6,793,241 B2 | 9/2004 | Wallner et al. | |
| 7,399,030 B2 | 7/2008 | Reizloff et al. | |
| 9,884,654 B1 | 2/2018 | Stojkovic et al. | |
| 10,035,408 B2* | 7/2018 | Crismon | B60J 7/106 |
| 10,538,216 B2 | 1/2020 | White et al. | |
| 2001/0022441 A1* | 9/2001 | Nakajima | B60R 21/213 280/730.2 |
| 2002/0024202 A1* | 2/2002 | Kubota | B60R 13/025 280/730.2 |
| 2002/0175504 A1* | 11/2002 | Tanase | B60R 21/232 280/730.2 |
| 2005/0046160 A1* | 3/2005 | Totani | B60R 21/213 280/730.2 |
| 2005/0052001 A1 | 3/2005 | Totani et al. | |
| 2006/0261580 A1 | 11/2006 | Tiesler et al. | |
| 2015/0224860 A1 | 8/2015 | Bowles et al. | |

FOREIGN PATENT DOCUMENTS

| | | |
|---|---|---|
| EP | 0857624 | 1/1998 |
| EP | 1914125 | 10/2007 |
| FR | 2998843 | 6/2014 |
| JP | 2004501018 | 1/2004 |
| KR | 20070121960 | 12/2007 |

* cited by examiner

OPEN FRAME VEHICLE SIDE OCCUPANT RESTRAINT SYSTEM

FIELD OF THE INVENTION

The present invention generally relates to a motor vehicle having an open frame vehicle architecture and, more particularly, to a roof rail having a cover member concealing a side air curtain provided with a releasable opening for deployment of the side air curtain.

BACKGROUND OF THE INVENTION

Traditional motor vehicle architecture may include a side air curtain/curtain air bag (SAC/CAB) that interfaces with a soft/flexible headliner and hard trim on the upper pillar trim. The soft/flexible headliner allows for the actuation of the SAC/CAB during an impact event. Certain nontraditional motor vehicles may employ an open frame vehicle architecture that provides the ability for the roof and doors to be removed by the customer. Thus, motor vehicles that employ an open frame vehicle architecture require unique design configurations to provide such additional occupant restraining features for occupants via a curtain restraint, where traditional applications for a SAC/CAB may not be entirely appropriate.

SUMMARY OF THE INVENTION

According to one aspect of the present invention, a unique solution is described that allows a SAC/CAB to be utilized in an open frame vehicle architecture motor vehicle with the use of hard interior trim components to help improve occupant protection performance. A roof rail assembly for a motor vehicle having an open frame vehicle architecture comprises a sports tube extending along a longitudinal axis of the motor vehicle. A side air curtain is fixedly coupled with the sports tube, the side air curtain having a stowed condition and an inflated condition, wherein the side air curtain is coupled to the metal sports tube via a first fastener oriented at a first angle relative a horizontal transverse plane of the sports tube. A roof rail trim cover is operatively coupled with the sports tube via a second fastener disposed proximate an upper edge of the roof rail trim cover and oriented at a second angle relative the horizontal transverse plane of the sports tube, wherein the first angle and the second angle are not parallel. The roof rail trim cover further comprises a cover member depending from the upper edge of the roof rail trim cover, the cover member having a longitudinal length disposed between a forward edge and a rearward edge of the cover member and a plurality of parallel hinges integrally molded into and extending along the longitudinal length of the cover member between the forward edge and the rearward edge. The cover member conceals the side air curtain in the stowed condition within a space behind the cover member and further comprises a releasable opening disposed parallel to the plurality of parallel hinges extending along the longitudinal length of the cover member, whereby activation of the side air curtain from the stowed condition to the inflated condition rotates the cover member about the plurality of parallel hinges to open the releasable opening to allow passage of the side air curtain during activation of the side air curtain from the stowed condition to the inflated condition.

Embodiments of the first aspect of the present disclosure can include any one or a combination of the following features:

The plurality of parallel hinges comprises a plurality of parallel material reduction grooves integrally molding into the cover member extending along the longitudinal length of the cover member between the forward edge and the rearward edge.

The plurality of parallel hinges are integrally molded into an inner surface of the cover member extending along the longitudinal length of the cover member between the forward edge and the rearward edge.

The first angle of the first fastener is adapted to facilitate a direction of the side air curtain during activation of the side air curtain from the stowed condition to the inflated condition.

The first angle of the first fastener is inclined between 18 and 20 degrees relative the horizontal transverse plane of the sports tube and the second angle of the second fastener is substantially parallel to the horizontal transverse plane of the sports tube.

The releasable opening of the cover member comprises a lower distal edge having a longitudinal length disposed between the forward edge and the rearward edge of the cover member and a fastenerless clip having a longitudinal length disposed below the cover member and operatively coupled with the roof rail assembly, wherein the lower distal edge interacts with the fastenerless clip to releasably attach the lower distal edge of the cover member to the roof rail assembly to conceal the side air curtain in the stowed condition within the space behind the cover member, and activation of the side air curtain from the stowed condition to the inflated condition disengages the lower distal edge of the cover member from the fastenerless clip and rotates the cover member about the plurality of parallel hinges to create an opening extending along the releasable opening to allow passage of the side air curtain during activation of the side air curtain from the stowed condition to the inflated condition.

The lower distal edge of the cover member interacting with the fastenerless clip comprises a chamfered surface that is received within a groove disposed on the fastenerless clip to releasably attach the lower distal edge to the roof rail assembly to conceal the side air curtain in the stowed condition within a space behind the cover member.

The fastenerless clip of the cover member is incorporated into a hard-interior trim component of the roof rail assembly.

The roof rail trim cover and the hard-interior trim component of the roof rail assembly is comprised of polypropylene.

The releasable opening of the cover member comprises a tear seam having a longitudinal length disposed between the forward edge and the rearward edge of the cover member and vertically disposed between the plurality of parallel hinges, and wherein activation of the side air curtain from the stowed condition to the inflated condition separates the tear seam and rotates an upper portion of the cover member upward and a lower portion of the cover member downward about the plurality of parallel hinges to create an opening between the upper and lower portion of the cover member to allow passage of the side air curtain during activation of the side air curtain from the stowed condition to the inflated condition.

The side air curtain is coupled to the metal sports tube via a plurality of fasteners oriented at the first angle relative a horizontal transverse plane of the sports tube aligned along the longitudinal axis of the motor vehicle and the roof rail assembly trim cover is operatively coupled with the sports tube via a plurality of fasteners at the second angle relative a horizontal transverse plane of the sports tube along the longitudinal axis of the motor vehicle.

The roof rail further comprises a padding disposed above the upper edge of the roof rail trim cover and extending along the longitudinal axis of the motor vehicle.

The sports tube is fabricated from a metal material.

According to another aspect of the present invention, a roof rail assembly for a motor vehicle having an open frame vehicle architecture comprises a sports tube extending along a longitudinal axis of the motor vehicle. A side air curtain is fixedly coupled with the sports tube, the side air curtain having a stowed condition and an inflated condition, wherein the side air curtain is coupled to the metal sports tube via a first fastener oriented at a first angle relative a horizontal transverse plane of the sports tube. A roof rail trim cover is operatively coupled with the sports tube via a second fastener disposed proximate an upper edge of the roof rail trim cover and oriented at a second angle relative the horizontal transverse plane of the sports tube, wherein the first angle and the second angle are not parallel. The roof rail trim cover further comprises a cover member depending from the upper edge of the roof rail trim cover, the cover member having a longitudinal length disposed between a forward edge and the rearward edge of the cover member and a plurality of parallel hinges integrally molded into and extending along the longitudinal length of the cover member between the forward edge and the rearward edge, wherein the cover member is adapted to conceal the side air curtain in the stowed condition within a space behind the cover member. A releasable opening is disposed parallel to the plurality of parallel hinges integrally molded into and extending along the longitudinal length of the cover member as a plurality of material reduction grooves on an inner surface of the cover member, whereby activation of the side air curtain from the stowed condition to the inflated condition rotates the cover member about the plurality of parallel hinges to open the releasable opening to allow passage of side air curtain during activation of the side air curtain from the stowed condition to the inflated condition.

Embodiments of the second aspect of the present disclosure can include any one or a combination of the following features:

The releasable opening of the cover member comprises a lower distal edge having a longitudinal length disposed between a forward edge and the rearward edge of the cover member and a fastenerless clip having a longitudinal length disposed below the cover member and operatively coupled with the roof rail assembly, wherein the lower distal edge interacts with the fastenerless clip to releasably attach the lower distal edge of the cover member to the roof rail assembly to conceal the side air curtain in the stowed condition within the space behind the cover member, and activation of the side air curtain from the stowed condition to the inflated condition disengages the lower distal edge of the cover member from the fastenerless clip and rotates the cover member about the plurality of parallel hinges to create an opening extending along the releasable opening to allow passage of the side air curtain during activation of the side air curtain from the stowed condition to the inflated condition.

The motor vehicle further comprises a vertical pillar operably coupled with and at least partially supporting the sports tube and A-pillar trim cover disposed on an interior surface of the vertical pillar, wherein the roof rail trim cover extends longitudinally over an upper portion of the vertical pillar and an upper portion of the pillar trim cover, and wherein a portion of the lower distal edge of the roof rail trim cover extending over the upper portion of the vertical pillar engages a longitudinal mating grooved formed in the pillar trim cover.

The first angle of the first fastener is adapted to inhibit rotation of the side air curtain about a center-line of the first fastener to facilitate the side air curtain exiting through the releasable opening.

The roof rail trim cover is fabricated from a molded weatherproof material.

According to yet another aspect of the present invention, a method of deploying a side air curtain operably coupled with a roof rail assembly for a motor vehicle having an open frame vehicle architecture comprises the steps of providing a sports tube extending along a longitudinal axis of the motor vehicle and fixedly coupling the side air curtain with the sports tube, the side air curtain having a stowed condition and an inflated condition, wherein the side air curtain is coupled to the metal sports tube via a first fastener oriented at a first angle relative a horizontal transverse plane of the sports tube. A roof rail trim cover is coupled to the sports tube via a second fastener disposed proximate an upper edge of the roof rail trim cover and oriented at a second angle relative the horizontal transverse plane of the sports tube, wherein the first angle and the second angle are not parallel, the roof rail trim cover further comprising a cover member depending from the upper edge of the roof rail trim cover, the cover member having a longitudinal length disposed between a forward edge and a rearward edge of the cover member and a plurality of parallel hinges integrally molded into and extending along the longitudinal length of the cover member between the forward edge and a rearward edge. The cover member is adapted to conceal the side air curtain in the stowed condition within a space behind the cover member. A releasable opening is provided that is disposed parallel to the plurality of parallel hinges integrally molded into and extending along the longitudinal length of the cover member as a plurality of material reduction grooves on a surface of the cover member, whereby activation of the side air curtain from the stowed condition to the inflated condition rotates the cover member about the plurality of parallel hinges to open the releasable opening to allow passage of side air curtain during activation of the side air curtain from the stowed condition to the inflated condition.

Embodiments of the third aspect of the present disclosure can include any one or a combination of the following features:

The step of integrally molding the plurality of parallel hinges to form a plurality of parallel material reduction grooves on an inner surface of the cover member extending along the longitudinal length of the cover member between the forward edge and the rearward edge.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
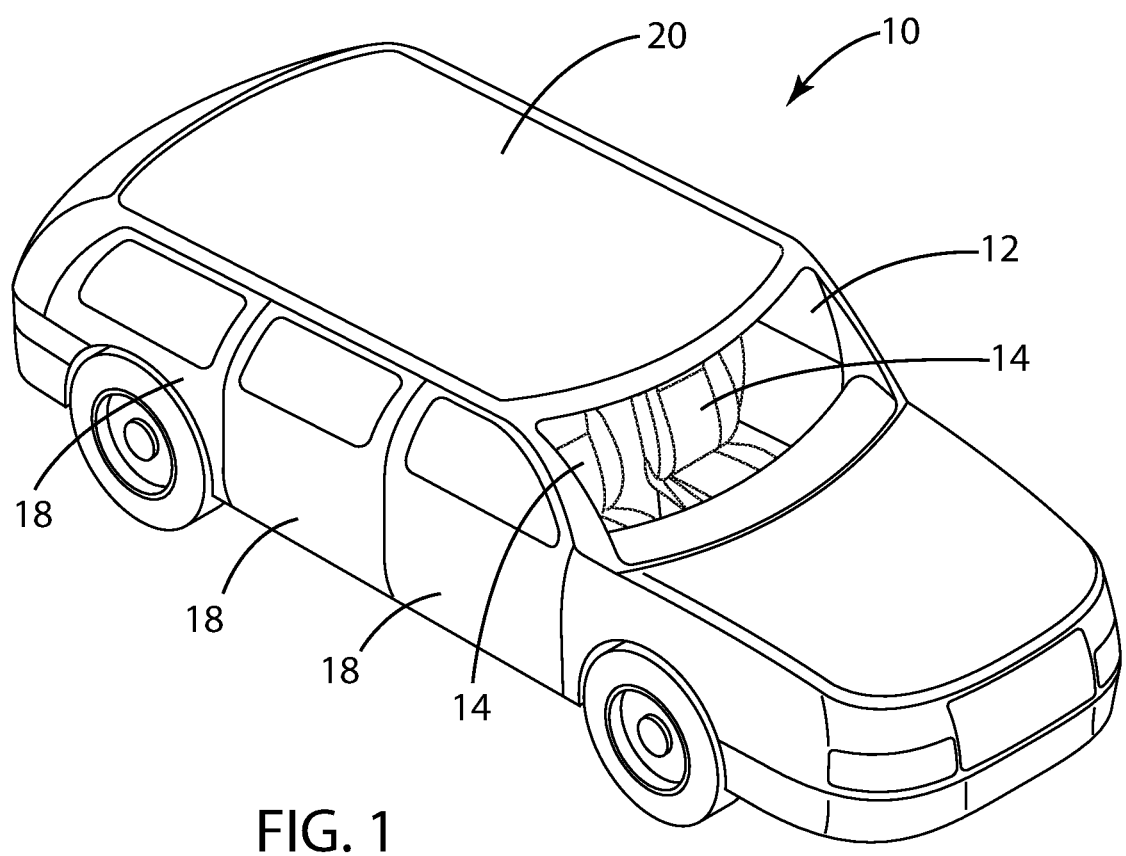
FIG. 1 is a perspective view of a motor vehicle having an open frame vehicle architecture equipped with a plurality of removable side door assemblies and a removable roof assembly in accordance with the present disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, reference numeral 10 generally designates a motor vehicle. Although illustrated as a six door, sport utility type vehicle, the motor vehicle 10 may be another other type of motor vehicle, such as a two or four door motor vehicle or a van, sedan, or truck. The motor vehicle 10, as is typical, includes an occupant compartment 12 within which a plurality of seating assemblies 14 are mounted. The occupant compartment 12 is nominally defined by a floor pan 16, and, as applicable to the present disclosure, a plurality of removable side door assemblies 18 and a removable roof assembly 20.

Figure 2:
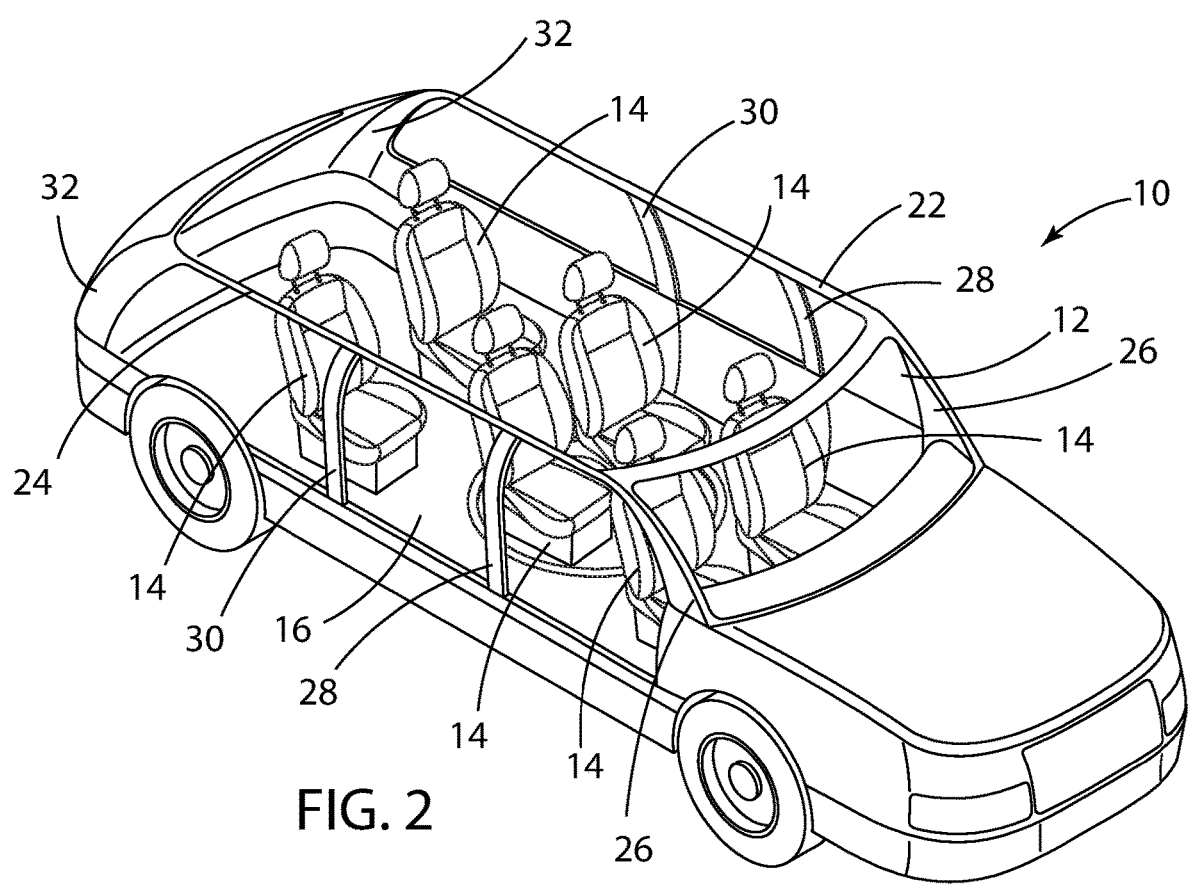
FIG. 2 is a perspective view of the motor vehicle having an open frame vehicle architecture in FIG. 1 with the plurality of removable side door assemblies and the removable roof assembly removed in accordance with the present disclosure.

As shown in FIG. 2, with the plurality of removable side door assemblies 18 and the removable roof assembly 20 removed, the open frame vehicle architecture of the motor vehicle 10 is apparent. A driver side roof rail assembly 22 and a passenger side roof rail assembly 24 extend horizontally and parallel to the longitudinal axis of the motor vehicle 10 and may be supported by an A-pillar 26, B-pillar 28, C-pillar 30, and D-pillar 32, as shown and as is known. Optionally, cross members (not shown) between the driver side roof rail assembly 22 and the passenger side roof rail assembly 24 may be provided. The driver side roof rail assembly 22 and the passenger side roof rail assembly 24 are identical mirror images of each other. As discussed below, the passenger side roof rail assembly 24 will be more fully described.

As best shown in FIGS. 4-7, roof rail assembly 24 includes a sports tube 34 extending along the longitudinal axis of the motor vehicle 10, upon which a side air curtain assembly 36 may be fixedly coupled, and a roof rail trim cover 38. The sports tube 34 is essentially the structural support for the roof rail assembly 24 and may be fabricated from a metal material, such as steel or aluminum. The sports tube 34 may be fixedly attached to the A-pillar 26, B-pillar 28, C-pillar 30, and D-pillar 32 via welding techniques and/or via fasteners, as is known, to create a substantially rigid structure partially defining the occupant compartment 12.

The roof rail trim cover 38 may be fabricated from a relatively hard polymer, such as polypropylene, to allow a side air curtain 40 of the side air curtain assembly 36 to deploy in different environmental conditions and temperatures at the lowest economic impact. The roof rail assembly 24 may also include padding 42 disposed above an upper edge 44 of the roof rail trim cover 38 and extending along the longitudinal axis of the motor vehicle 10, wherein the padding 42 may include an energy absorbing material, such as foam.

As shown in FIGS. 4-11, the roof rail assembly 24 may also include a roof gasket 46 coupled with an upper edge 48 of a flange 50 extending laterally outboard from the sports tube 34 and a window gasket 52 coupled with a lower surface 54 of the flange 50. The roof gasket 46 provides a sealing interface between the removable roof assembly 20 and the roof rail assembly 24, while the window gasket 52 provides a sealing interface between an upper portion of the side door assembly or the window glass 56 of the removable side door assembly 18 and the roof rail assembly 24.

Figure 3:
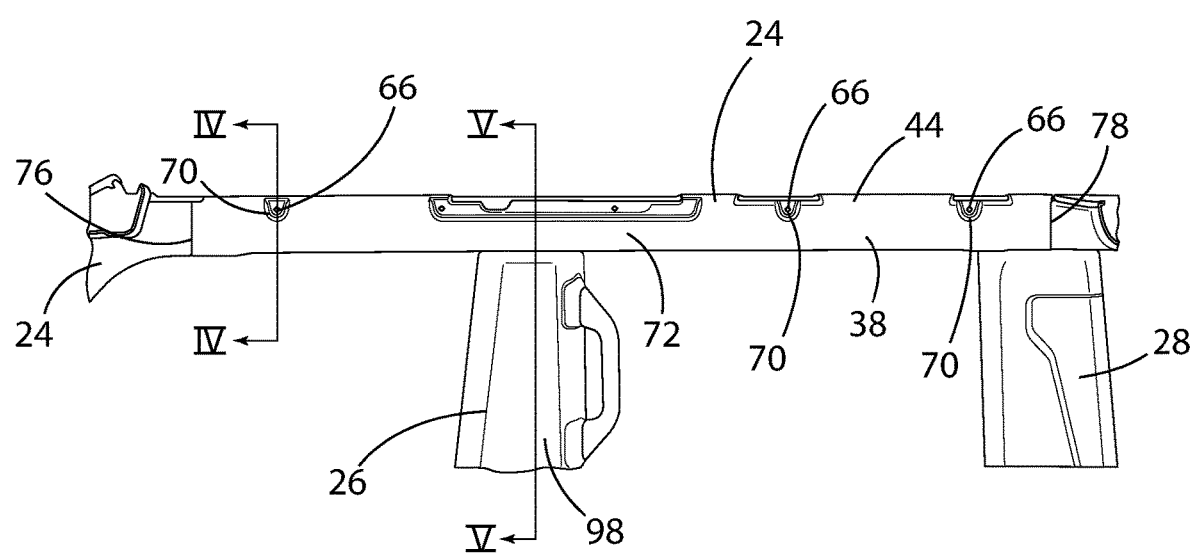
FIG. 3 is a side view of a roof rail assembly in accordance with the present disclosure.
Figure 4:
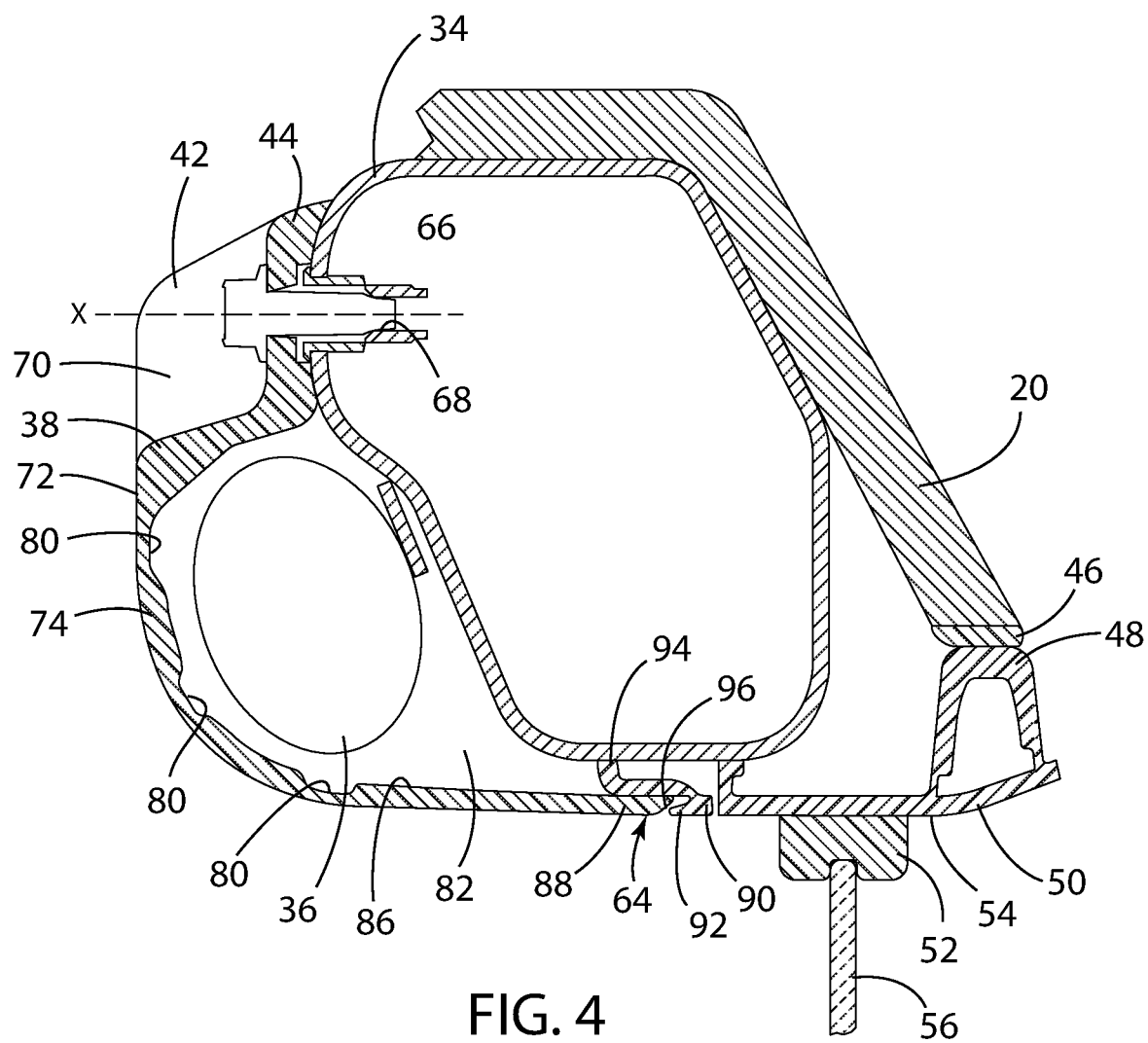
FIG. 4 is a cross-sectional view of a first embodiment of the roof rail assembly taken along the line IV-IV in FIG. 3 with the side air curtain in the stowed condition in accordance with the present disclosure.
Figure 5:
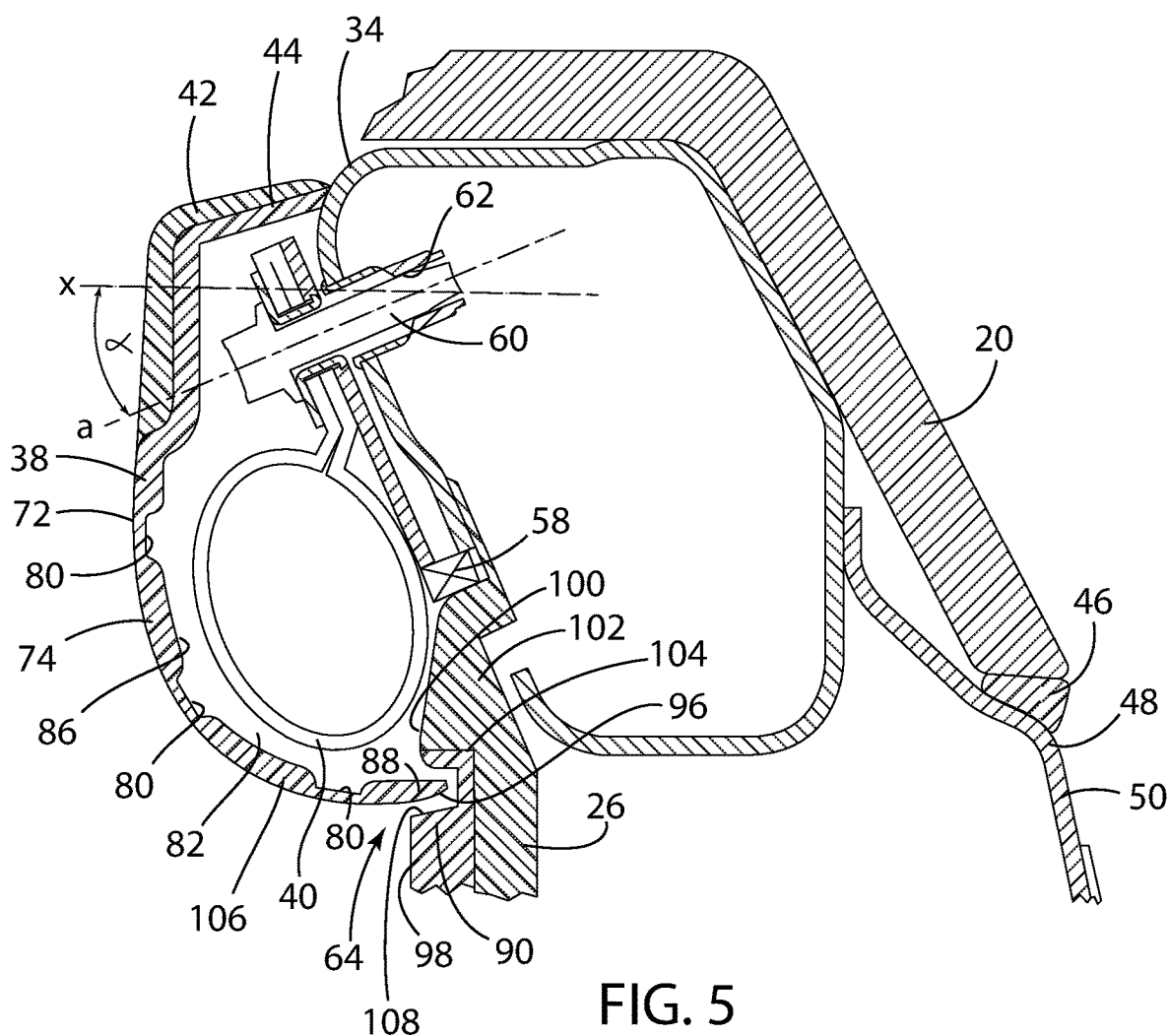
FIG. 5 is a cross-sectional view of the first embodiment of the roof rail assembly taken along the line V-V in FIG. 3 with the side air curtain in the stowed condition in accordance with the present disclosure.

The side air curtain assembly 36 includes the side air curtain 40 and an ignitor 58, as is known. The side air curtain 40 has a stowed condition, shown in FIGS. 4-5, and an inflated condition, shown in FIGS. 6-7. The side air curtain 40 may be coupled to the metal sports tube 34 via a plurality of first fasteners 60 disposed within a plurality of first fastener holes 62 extending longitudinally along the roof rail assembly 24 and having a centerline along a plane a oriented at a first angle α relative a horizontal transverse plane x of the sports tube, as shown in FIG. 5. FIG. 5 is taken as a cross-sectional view proximate the B-pillar 28 along the line V-V in FIG. 3. The first angle α of the plurality of first fasteners 60 is adapted to inhibit rotation of the side air curtain 40 about the center-line of the plurality of first fasteners 60 to facilitate the side air curtain 40 exiting through a releasable opening 64, as further described below.

The roof rail trim cover 38 may be operatively coupled with the sports tube 34 via a plurality of second fasteners 66 disposed in a plurality of second fastener holes 68 proximate the upper edge 44 of the roof rail trim cover 38 and extending longitudinally along the roof rail assembly 24, where the centerline of the plurality of second fasteners 66 is oriented in a plane along a second angle relative the horizontal transverse plane x of the sports tube 34. As shown in FIG. 4, taken as a cross-sectional view between the A-pillar 26 and the B-pillar 28 along the line IV-IV in FIG. 3, the centerline of the second fastener 66 is oriented in a plane at a second angle that is parallel relative the horizontal transverse plane x of the sports tube 34. Thus, the first angle α and the second angle are not parallel.

Figure 7:
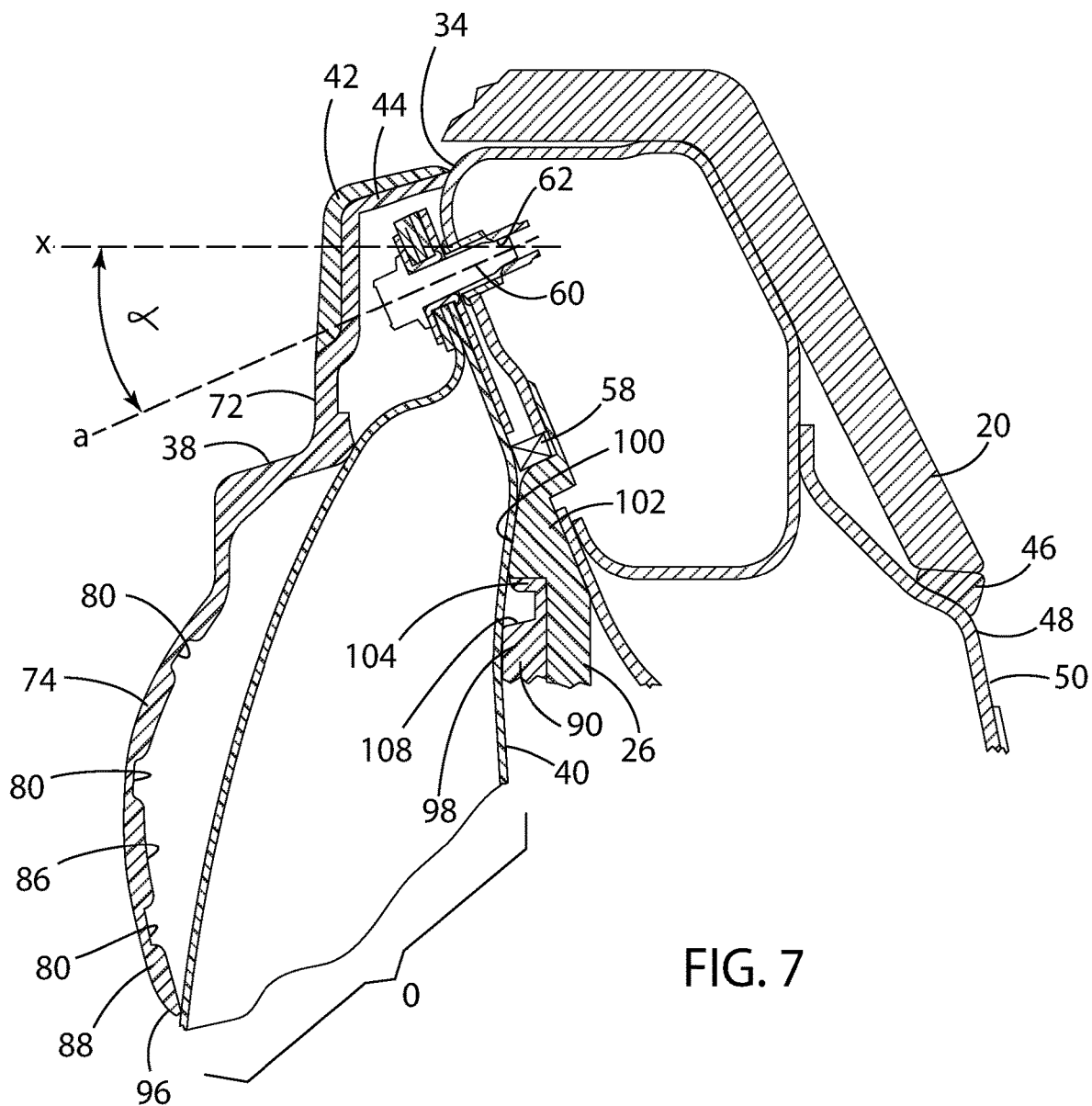
FIG. 7 is a cross-sectional view of the first embodiment of the roof rail assembly taken along the line V-V in FIG. 3 with the side air curtain in the inflated condition in accordance with the present disclosure.

As shown in FIG. 7, the first angle α of the plurality of first fasteners 60 is adapted to facilitate the direction of the side air curtain 40 during activation of the side air curtain 40 from the stowed condition to the inflated condition. The first angle α of the plurality of first fasteners 60 mounting the side air curtain 40 may be inclined between 18 and 20 degrees relative the horizontal transverse plane x of the sports tube 34 and the second angle of the plurality of second fasteners 66 mounting the roof rail trim cover 38 may be substantially parallel to the horizontal transverse plane x of the sports tube 34. As perhaps best shown in FIGS. 3 and 4, the plurality of second fasteners 66 may be mounted through a plurality of recesses 70 arranged along the interior outer surface 72 of the roof rail trim cover 38 in order to partially conceal and thereby minimize their visual appearance. The plurality of first fasteners 60 and the plurality of second fasteners 66 are shown as threaded fasteners, such a bolts. However, screws, rivets, or other fasteners may be employed.

Figure 6:
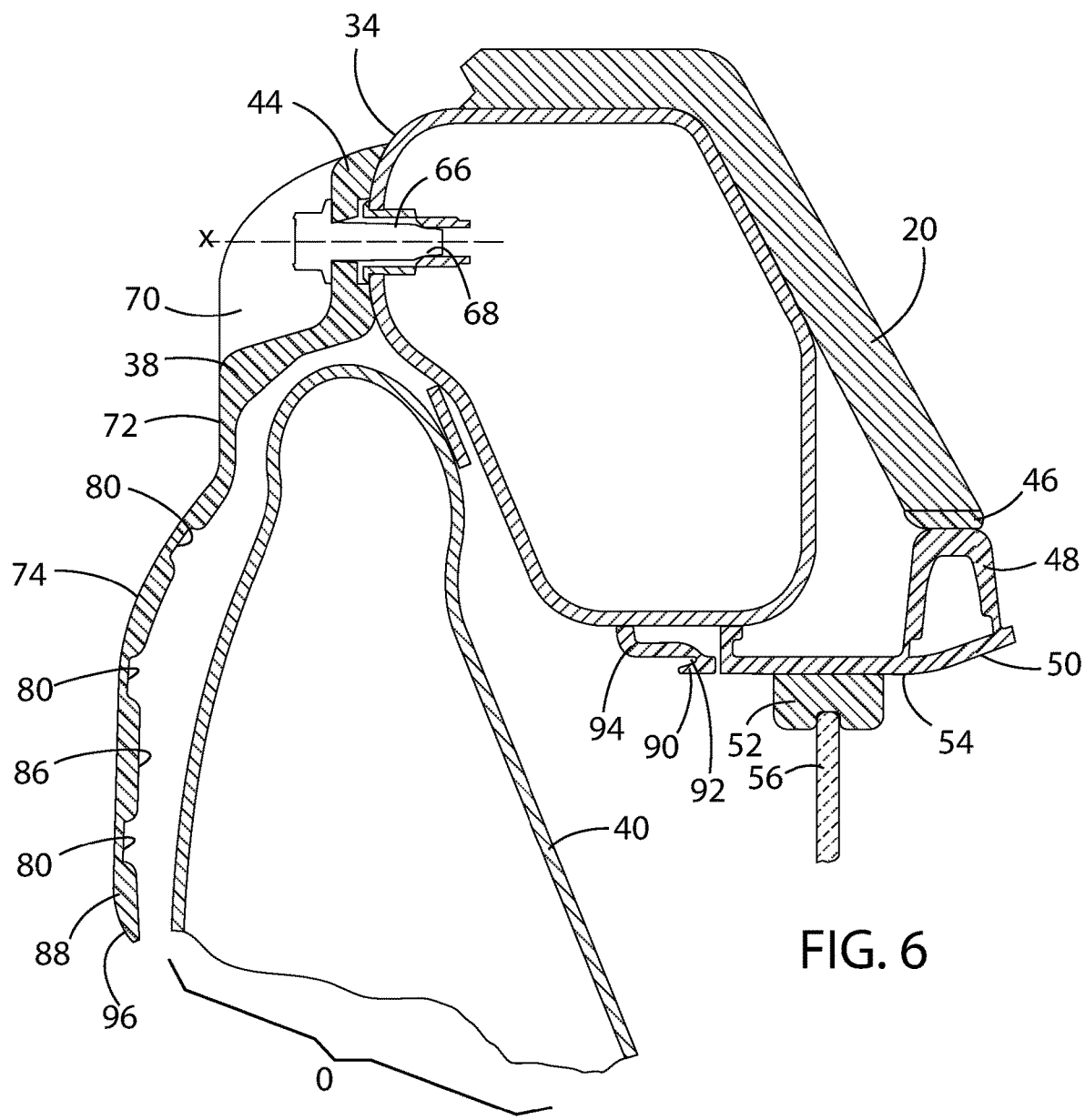
FIG. 6 is a cross-sectional view of the first embodiment of the roof rail assembly taken along the line IV-IV in FIG. 3 with the side air curtain in the inflated condition in accordance with the present disclosure.

The roof rail trim cover 38 may also include a cover member 74 depending from the upper edge 44 of the roof rail trim cover 38. The cover member 74 may have a longitudinal length disposed between a forward edge 76 and the rearward edge 78 of the roof rail trim cover 38 and a plurality of parallel hinges 80 integrally molded into and extending along the longitudinal length of the cover member 74 between the forward edge 76 and the rearward edge 78, as shown in FIG. 3. As shown in FIGS. 3-5, the cover member 74 conceals the side air curtain assembly 36 in the stowed condition within a space 82 behind the cover member 74. The cover member 74 may also include the elongated releasable opening 64 disposed parallel to the plurality of parallel hinges 80 extending along the longitudinal length of the cover member 74. As shown in FIGS. 6-7, the forces within the space 82 developed by activation of the side air curtain 40 from the stowed condition to the inflated condition pushes against an inner surface 86 of the cover member 74 and thereby rotates the cover member 74 about the plurality of parallel hinges 80 to open the releasable opening 64 to allow passage of side air curtain 40 out of the roof rail assembly 24 during activation of the side air curtain 40 from the stowed condition to the inflated condition.

The plurality of parallel hinges 80 may comprise a plurality of parallel material reduction grooves integrally molding into an inner surface 86 of the cover member extending along the longitudinal length of the cover member between the forward edge 76 and the rearward edge 78. Alternatively, the plurality of parallel hinges 80 may comprise a plurality of parallel material reduction grooves formed into an inner surface 86 of the cover member subsequent molding of the cover member.

In a first embodiment shown in FIGS. 4-7, the releasable opening 64 of the cover member comprises a lower distal edge 88 having a longitudinal length disposed between the forward edge 76 and the rearward edge 78 of the cover member 74 that is received within a fastenerless clip 90 having a longitudinal length disposed below the cover member 74 and operatively coupled with the roof rail assembly 24. The fastenerless clip 90 may be incorporated as a groove 92 into a separate hard-interior trim base 94 fixedly coupled with the roof rail assembly 24 and may be integrally molded therewith. The roof rail trim cover 74 and the hard-interior trim base 94 of the roof rail assembly 24 may be formed of a weatherproof material, again such as polypropylene.

The lower distal edge 88 of the cover member 74 is received within and interacts with the fastenerless clip 90 to releasably attach the lower distal edge 88 of the cover member 74 to the roof rail assembly 24 to conceal the side air curtain assembly 36 in the stowed condition within the space 82 behind the cover member 74. Activation of the side air curtain 40 from the stowed condition to the inflated condition generates a force sufficient to disengage the lower distal edge 88 of the cover member 74 from the fastenerless clip 90 and rotate the cover member 74 about the plurality of parallel hinges 80 to create an opening O extending along the releasable opening to allow passage of the side air curtain during activation of the side air curtain from the stowed condition to the inflated condition, as shown in FIGS. 6 and 7. The lower distal edge 88 of the cover member 74 interacting with the fastenerless clip 90 may include a chamfered surface 96 that is received within the groove 92 disposed on the fastenerless clip 90 to releasably attach the lower distal edge 88 to the roof rail assembly 24 to conceal the side air curtain assembly 36 in the stowed condition within the space 82 behind the cover member 38. The use of a chamfered surface 96 aids in the release of the lower distal edge 88 from the fastenerless clip 90 upon a predetermined force and improve visual appearance.

As noted above, the vertical B-pillar 28 may be operably coupled with and at least partially supports the sports tube 34. A-pillar trim cover 98 may be disposed on an interior surface 100 of the vertical B-pillar 28. As shown in FIG. 3, the cover member 74 of the roof rail trim cover 38 extends longitudinally over an upper portion 102 of the vertical B-pillar 28 and an upper portion 104 of the pillar trim cover 98. As shown in FIG. 5, in order to present an aesthetic appearance, a lower portion 106 of the roof rail trim cover 38 extending over the upper portion 102 of the vertical B-pillar 28 and the upper portion 104 of the pillar trim cover 98 engages a longitudinal mating groove 108 formed in the pillar trim cover 98 to improve visual appearance.

Figure 8:
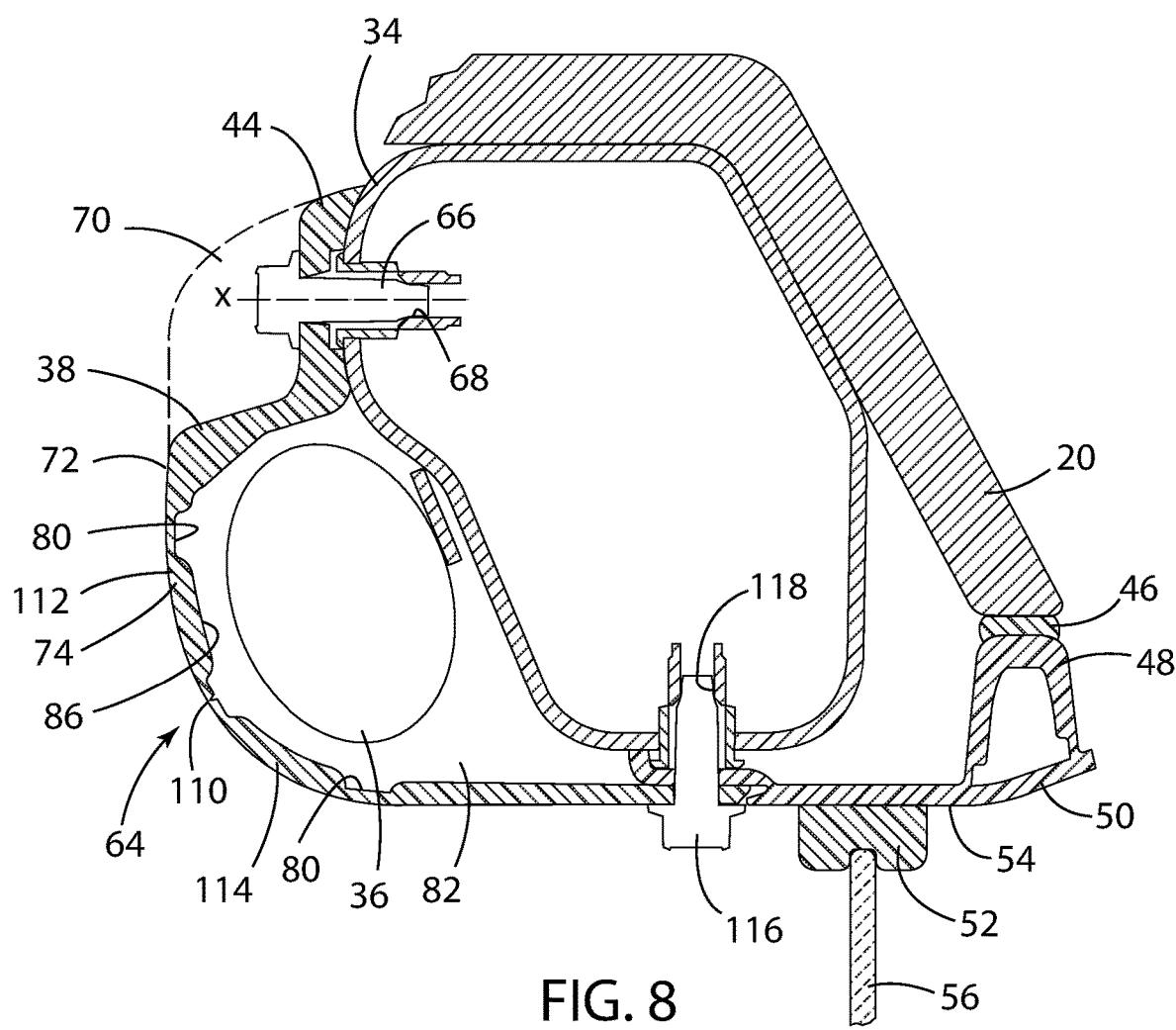
FIG. 8 is a cross-sectional view of a second embodiment of the roof rail assembly taken along the line IV-IV in FIG. 3 with the side air curtain in the stowed condition in accordance with the present disclosure.
Figure 9:
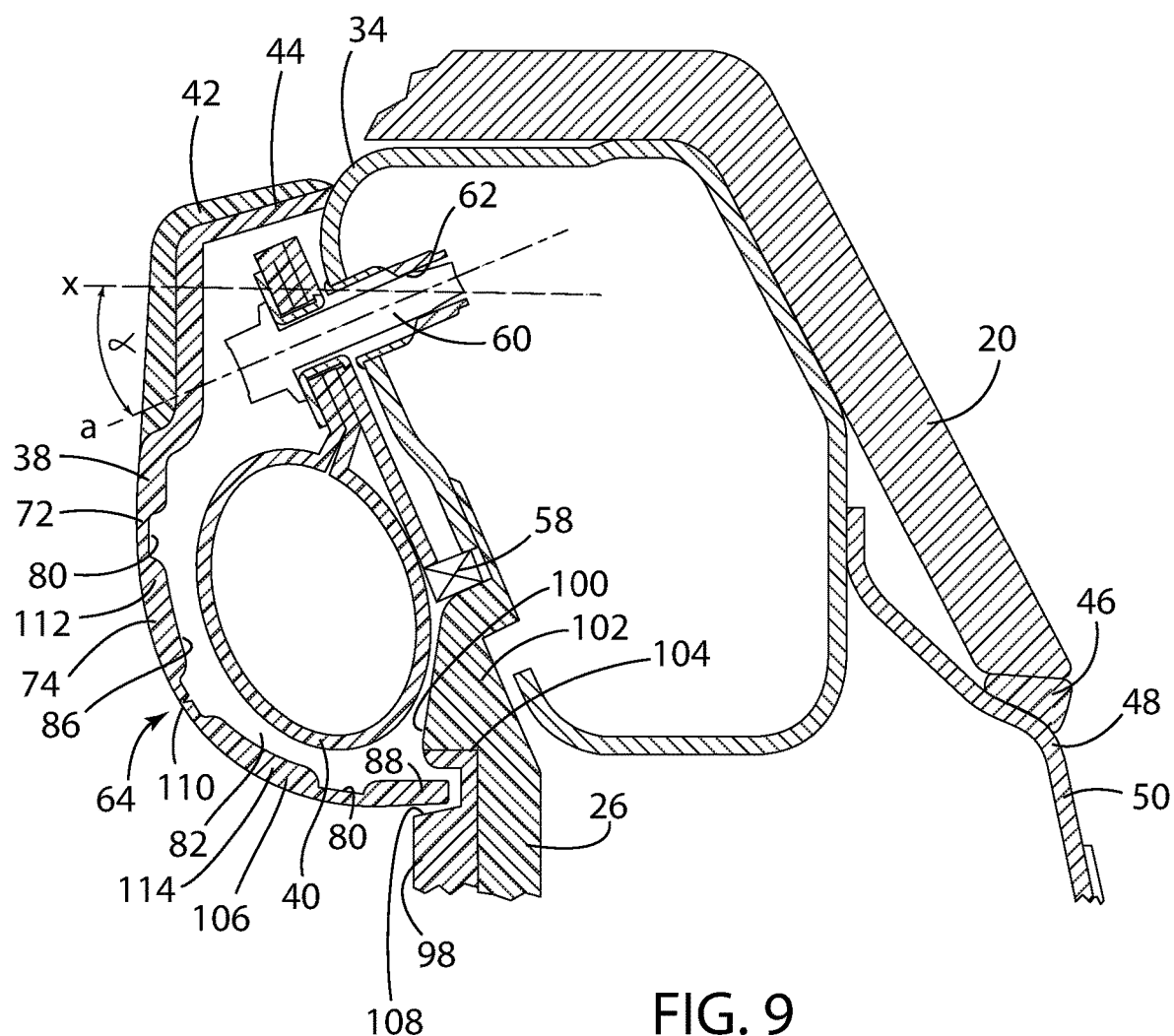
FIG. 9 is a cross-sectional view of the second embodiment of the roof rail assembly taken along the line V-V in FIG. 3 with the side air curtain in the stowed condition in accordance with the present disclosure.
Figure 10:
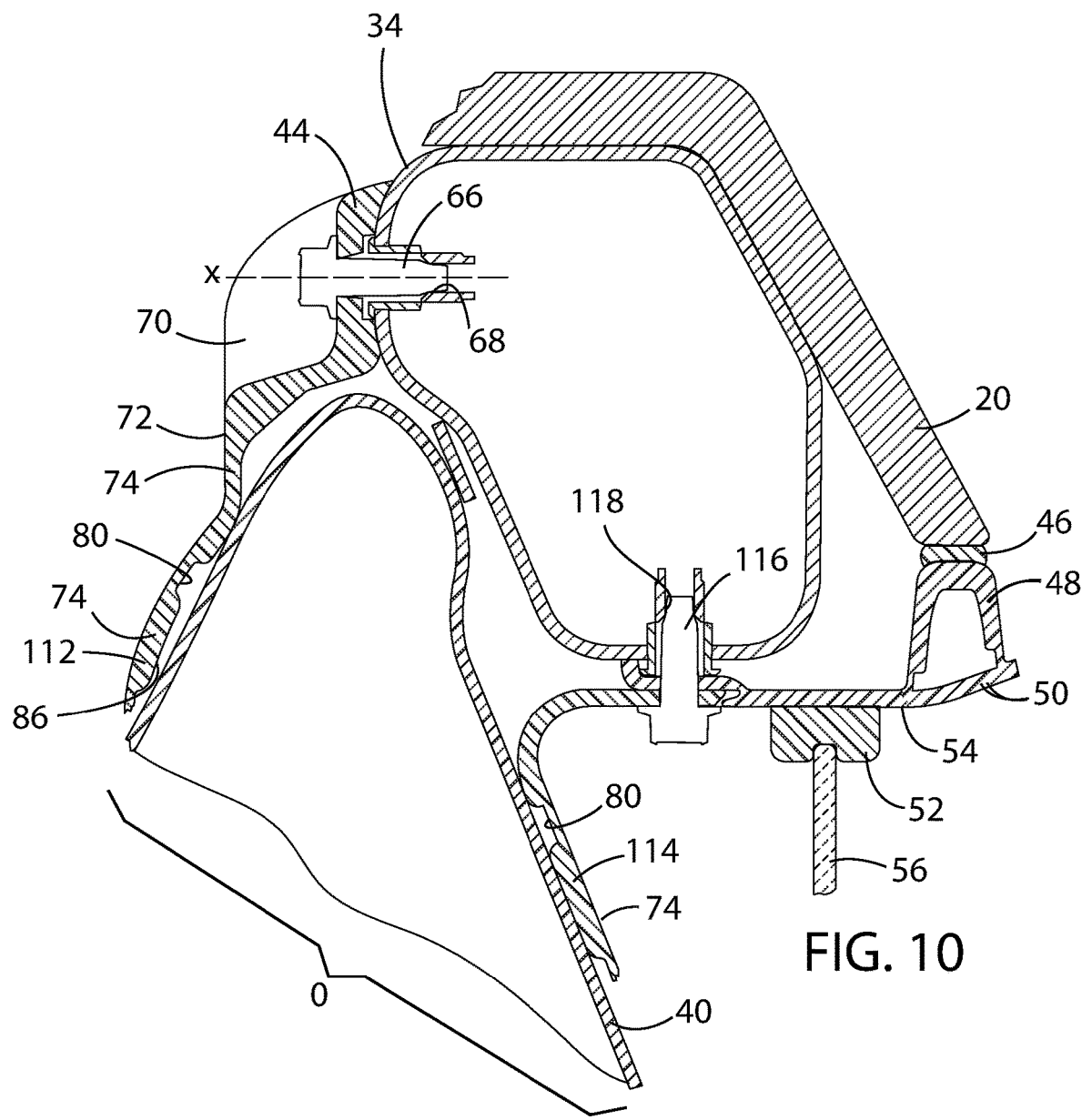
FIG. 10 is a cross-sectional view of the second embodiment of the roof rail assembly taken along the line IV-IV in FIG. 3 with the side air curtain in the inflated condition in accordance with the present disclosure.
Figure 11:
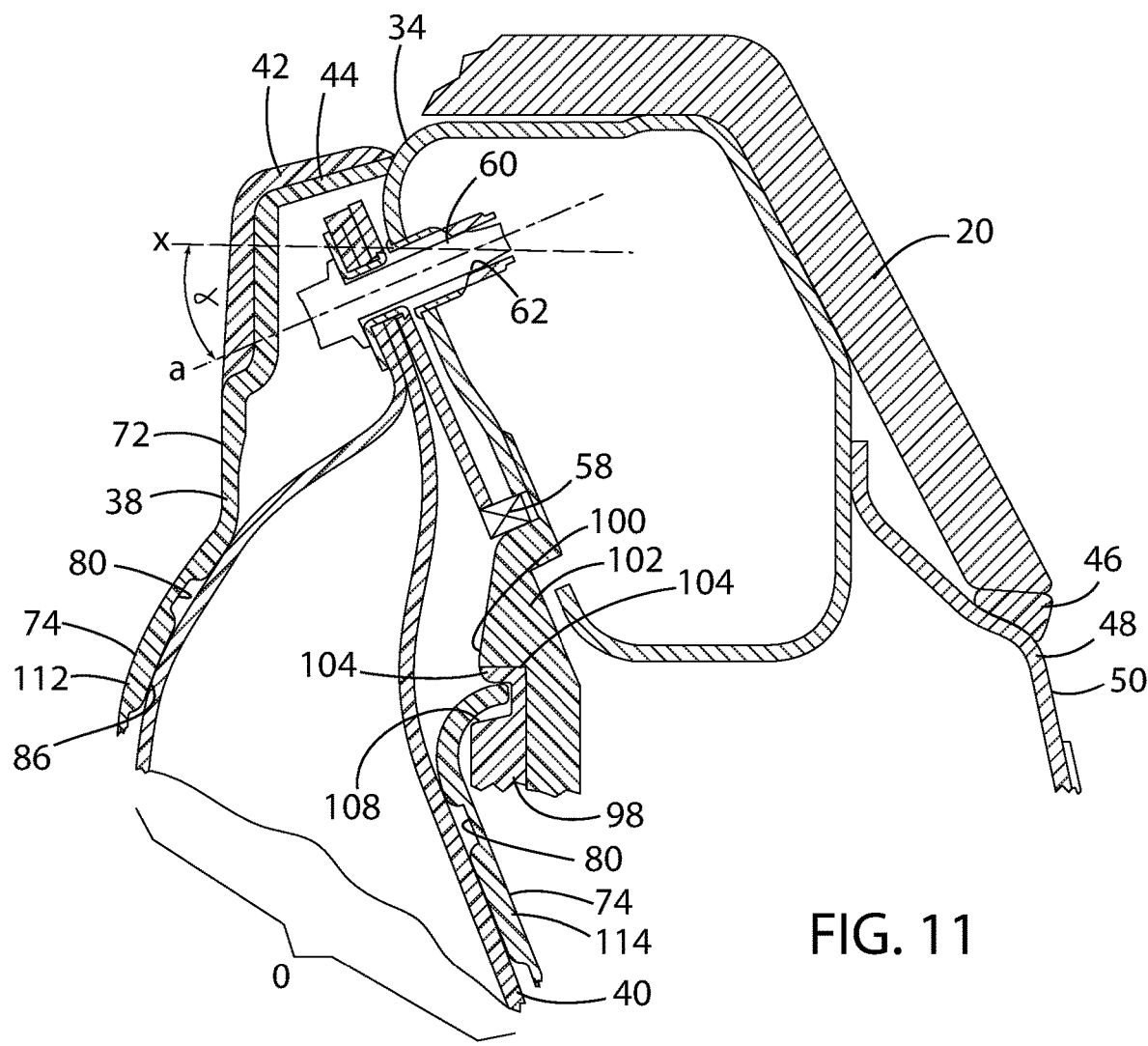
FIG. 11 is a cross-sectional view of the second embodiment of the roof rail assembly taken along the line V-V in FIG. 3 with the side air curtain in the inflated condition in accordance with the present disclosure.

In a second embodiment shown in FIGS. 8-11, the releasable opening 64 of the cover member 74 comprises a tear seam 110 having a longitudinal length disposed between the forward edge 76 and the rearward edge 78 of the cover member 74 and vertically disposed between the plurality of parallel hinges 80. As shown in FIG. 11, activation of the side air curtain 40 from the stowed condition to the inflated condition separates the tear seam 110 and rotates an upper portion 112 of the cover member 74 upward and a lower portion 114 of the cover member 74 downward about the plurality of parallel hinges 80 to create an opening O between the upper portion 112 and lower portion 114 of the cover member 74 to allow passage of the side air curtain 40 during activation of the side air curtain 40 from the stowed condition to the inflated condition. The lower portion 114 of the cover member 74 may be separately coupled with the sports tube 34 via a plurality of third fasteners 116 disposed in a plurality of third fastener holes 118 and extending longitudinally along the roof rail assembly 24, as shown in FIGS. 8 and 10.

The implementation of a side air curtain assembly 36 on an open frame architecture motor vehicle 10 may be achieved via the use of a set of hard-interior trim components, such as roof rail trim cover 38 and the hard-interior trim base 94 disclosed herein, fabricated from polypropylene. That is, without a static soft headliner, an open frame architecture motor vehicle 10 will require the side air curtain 40 to deploy through a series of hard-interior trim components. The side air curtain 40 is attached positively to the sports tube 34 having a metal body via the plurality of first fasteners 60 having a centerline along a plane that is angled relative the horizontal transverse plane x of the sports tube 34 to help assist the directionality of the side air curtain 40 during activation.

The hard-interior trim components, particularly the roof rail trim cover 38, are attached to the sports tube 34 via a similar method, but via a plurality of second fasteners 66 having a centerline along a plane that is not parallel to the centerline of the plurality of first fasteners 60 to help inhibit the rotation of the fixed portions of hard-interior trim components about the center-line of the plurality of first fastener 60 angular orientations to facilitate the exit of the side air curtain 40 through the releasable opening 64. The manner of how the roof rail trim cover 38 is thus shingled relative the side air curtain 40 helps increase the size of the resulting opening O desired for the side air curtain 40 exiting the space 82 behind the roof rail trim cover 38.

That is, the method of deploying the side air curtain 40 operably coupled with a roof rail assembly for a motor vehicle 10 having an open frame vehicle architecture includes the steps of providing the sports tube 34 extending along a longitudinal axis of the motor vehicle 10 and fixedly coupling the side air curtain assembly 36 with the sports tube 34 via the plurality of first fasteners 60 oriented at the first angle relative a horizontal transverse plane x of the sports tube 34. The roof rail trim cover 38 is then operatively coupled to the sports tube 34 via a plurality of second fasteners 66 disposed proximate the upper edge 44 of the roof rail trim cover 38 and oriented at a second angle relative the horizontal transverse plane x of the sports tube, wherein the first angle and the second angle are not parallel. The roof rail trim cover 38 includes the cover member 74 depending from the upper edge 44 of the roof rail trim cover 38, the cover member 74 having a longitudinal length disposed between the forward edge 76 and the rearward edge 78 of the cover member 74 and a plurality of parallel hinges 80 integrally molded into and extending along the longitudinal length of the cover member 74 between the forward edge 76 and a rearward edge 78, wherein the cover member 74 is adapted to conceal the side air curtain in the stowed condition within a space 82 behind the cover member 74.

A releasable opening 64 is provided that is disposed parallel to the plurality of parallel hinges 80 integrally molded into and extending along the longitudinal length of the cover member 74 as a plurality of material reduction grooves on an inner surface 86 of the cover member 74, whereby activation of the side air curtain 40 from the stowed condition to the inflated condition rotates the cover member 74 about the plurality of parallel hinges 80 to open the releasable opening 64 to allow passage of side air curtain 40 during activation of the side air curtain 40.

The material thickness of the plurality of parallel hinges 80 contributes to the function of side air curtain 40 during inflation. Implementing the parallel hinges 80 as a series of material reduction grooves on the inner surface 86 of the cover member 74 and full rotation of the cover member 74 away from the side air curtain 40 during inflation promotes full and rapid inflation of the side air curtain 40 in the desired direction through the releasable opening 64, either under the lower distal edge 88 of the cover member 74 or through the tear seam 110 in the cover member 74. That is, the use of material thickness variation as disclosed herein effectively allows the side air curtain 40 to be aimed in alternative directions and through a final opening size O that promotes full and rapids inflation of the side air curtain 40. Moreover, the number of the plurality of parallel hinges 80 may be increased from that shown in order to facilitate increased rotation as may be desired to obtain the desired final opening size O.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A roof rail assembly for a motor vehicle having an open frame vehicle architecture comprising:
a sports tube extending along a longitudinal axis of the motor vehicle;
a side air curtain fixedly coupled with the sports tube, the side air curtain having a stowed condition and an inflated condition, wherein the side air curtain is coupled to the metal sports tube via a first fastener oriented at a first angle relative a horizontal transverse plane of the sports tube; and
a roof rail trim cover operatively coupled with the sports tube via a second fastener disposed proximate an upper edge of the roof rail trim cover and oriented at a second angle relative the horizontal transverse plane of the sports tube, wherein the first angle and the second angle are not parallel, the roof rail trim cover further comprising a cover member depending from the upper edge of the roof rail trim cover, the cover member having a longitudinal length disposed between a forward edge of the cover member and a rearward edge of the cover member and a plurality of parallel hinges integrally molded into and extending along the longitudinal length of the cover member between the forward edge of the cover member and the rearward edge of the cover member;
wherein the cover member conceals the side air curtain in the stowed condition within a space behind the cover member and further comprises a releasable opening disposed parallel to the plurality of parallel hinges extending along the longitudinal length of the cover member, whereby activation of the side air curtain from the stowed condition to the inflated condition rotates the cover member about the plurality of parallel hinges to open the releasable opening to allow passage of the side air curtain during activation of the side air curtain from the stowed condition to the inflated condition;
wherein the releasable opening of the cover member comprises a lower distal edge having a longitudinal length disposed between the forward edge of the cover member and the rearward edge of the cover member and a fastenerless clip having a longitudinal length disposed below the cover member and operatively coupled with the roof rail assembly;
wherein the lower distal edge interacts with the fastenerless clip to releasably attach the lower distal edge of the cover member to the roof rail assembly to conceal the side air curtain in the stowed condition within the space behind the cover member, and activation of the side air curtain from the stowed condition to the inflated condition disengages the lower distal edge of the cover member from the fastenerless clip and rotates the cover member about the plurality of parallel hinges to create an opening extending along the releasable opening to allow passage of the side air curtain during activation of the side air curtain from the stowed condition to the inflated condition; and
wherein the lower distal edge of the cover member interacting with the fastenerless clip comprises a chamfered surface that is received within a groove disposed on the fastenerless clip to releasably attach the lower distal edge to the roof rail assembly to conceal the side air curtain in the stowed condition within a space behind the cover member.

2. The roof rail assembly of claim 1, wherein the plurality of parallel hinges comprises a plurality of parallel material reduction grooves integrally molding into the cover member extending along the longitudinal length of the cover member between the forward edge of the cover member and the rearward edge of the cover member.

3. The roof rail assembly of claim 2, wherein the plurality of parallel hinges are integrally molded into an inner surface of the cover member extending along the longitudinal length of the cover member between the forward edge of the cover member and the rearward edge of the cover member.

4. The roof rail assembly of claim 1, wherein the first angle of the first fastener is adapted to facilitate a direction of the side air curtain during activation of the side air curtain from the stowed condition to the inflated condition.

5. The roof rail assembly of claim 4, wherein the first angle of the first fastener is inclined between 18 and 20 degrees relative the horizontal transverse plane of the sports tube and the second angle of the second fastener is substantially parallel to the horizontal transverse plane of the sports tube.

6. The roof rail assembly of claim 1, wherein the fastenerless clip of the cover member is incorporated into a hard-interior trim component of the roof rail assembly.

7. The roof rail assembly of claim 6, wherein the roof rail trim cover and the hard-interior trim component of the roof rail assembly is comprised of polypropylene.

8. The roof rail assembly of claim 1, wherein the side air curtain is coupled to the metal sports tube via a plurality of fasteners oriented at the first angle relative the horizontal transverse plane of the sports tube aligned along the longitudinal axis of the motor vehicle and the roof rail trim cover is operatively coupled with the sports tube via a plurality of fasteners at the second angle relative a horizontal transverse plane of the sports tube along the longitudinal axis of the motor vehicle.

9. The roof rail assembly of claim 1, wherein the roof rail further comprises a padding disposed above the upper edge of the roof rail trim cover and extending along the longitudinal axis of the motor vehicle.

10. The roof rail assembly of claim 1, wherein the sports tube is fabricated from a metal material.

11. A roof rail assembly for a motor vehicle having an open frame vehicle architecture comprising:
a sports tube extending along a longitudinal axis of the motor vehicle;
a side air curtain fixedly coupled with the sports tube, the side air curtain having a stowed condition and an inflated condition, wherein the side air curtain is coupled to the metal sports tube via a first fastener oriented at a first angle relative a horizontal transverse plane of the sports tube; and
a roof rail trim cover operatively coupled with the sports tube via a second fastener disposed proximate an upper edge of the roof rail trim cover and oriented at a second angle relative the horizontal transverse plane of the sports tube, wherein the first angle and the second angle are not parallel, the roof rail trim cover further comprising a cover member depending from the upper edge of the roof rail trim cover, the cover member having a longitudinal length disposed between a forward edge of the cover member and a rearward edge of the cover member and a plurality of parallel hinges integrally molded into and extending along the longitudinal length of the cover member between the forward edge of the cover member and the rearward edge of the cover member;

wherein the cover member conceals the side air curtain in the stowed condition within a space behind the cover member and further comprises a releasable opening disposed parallel to the plurality of parallel hinges extending along the longitudinal length of the cover member, whereby activation of the side air curtain from the stowed condition to the inflated condition rotates the cover member about the plurality of parallel hinges to open the releasable opening to allow passage of the side air curtain during activation of the side air curtain from the stowed condition to the inflated condition, wherein the releasable opening of the cover member comprises a tear seam having a longitudinal length disposed between the forward edge of the cover member and the rearward edge of the cover member and vertically disposed between the plurality of parallel hinges; and wherein activation of the side air curtain from the stowed condition to the inflated condition separates the tear seam and rotates an upper portion of the cover member upward and a lower portion of the cover member downward about the plurality of parallel hinges to create an opening between the upper and lower portion of the cover member to allow passage of the side air curtain during activation of the side air curtain from the stowed condition to the inflated condition.

12. A roof rail assembly for a motor vehicle having an open frame vehicle architecture comprising:

a sports tube extending along a longitudinal axis of the motor vehicle;

a side air curtain fixedly coupled with the sports tube, the side air curtain having a stowed condition and an inflated condition, wherein the side air curtain is coupled to the metal sports tube via a first fastener oriented at a first angle relative a horizontal transverse plane of the sports tube;

a roof rail trim cover operatively coupled with the sports tube via a second fastener disposed proximate an upper edge of the roof rail trim cover and oriented at a second angle relative the horizontal transverse plane of the sports tube, wherein the first angle and the second angle are not parallel, the roof rail trim cover further comprising a cover member depending from the upper edge of the roof rail trim cover, the cover member having a longitudinal length disposed between a forward edge of the cover member and a rearward edge of the cover member and a plurality of parallel hinges integrally molded into and extending along the longitudinal length of the cover member between the forward edge of the cover member and the rearward edge of the cover member, wherein the cover member is adapted to conceal the side air curtain in the stowed condition within a space behind the cover member, and a releasable opening disposed parallel to the plurality of parallel hinges integrally molded into and extending along the longitudinal length of the cover member as a plurality of material reduction grooves on an inner surface of the cover member, whereby activation of the side air curtain from the stowed condition to the inflated condition rotates the cover member about the plurality of parallel hinges to open the releasable opening to allow passage of side air curtain during activation of the side air curtain from the stowed condition to the inflated condition;

wherein the releasable opening of the cover member comprises a lower distal edge having a longitudinal length disposed between the forward edge of the cover member and the rearward edge of the cover member and a fastenerless clip having a longitudinal length disposed below the cover member and operatively coupled with the roof rail assembly;

wherein the lower distal edge interacts with the fastenerless clip to releasably attach the lower distal edge of the cover member to the roof rail assembly to conceal the side air curtain in the stowed condition within the space behind the cover member, and activation of the side air curtain from the stowed condition to the inflated condition disengages the lower distal edge of the cover member from the fastenerless clip and rotates the cover member about the plurality of parallel hinges to create an opening extending along the releasable opening to allow passage of the side air curtain during activation of the side air curtain from the stowed condition to the inflated condition;

wherein the motor vehicle further comprises a vertical pillar operably coupled with and at least partially supporting the sports tube and an A-pillar trim cover disposed on an interior surface of the vertical pillar, and wherein the roof rail trim cover extends longitudinally over an upper portion of the vertical pillar and an upper portion of the pillar trim cover, and wherein a portion of the lower distal edge of the roof rail trim cover extending over the upper portion of the vertical pillar engages a longitudinal mating groove formed in the pillar trim cover.

13. The roof rail assembly of claim 12, wherein the first angle of the first fastener is adapted to inhibit rotation of the side air curtain about a center-line of the first fastener to facilitate the side air curtain exiting through the releasable opening.

14. The roof rail assembly of claim 13, wherein the roof rail trim cover is fabricated from a molded weatherproof material.

15. The roof rail assembly of claim 12, wherein the side air curtain is coupled to the metal sports tube via a plurality of fasteners oriented at the first angle relative the horizontal transverse plane of the sports tube aligned along the longitudinal axis of the motor vehicle and the roof rail trim cover is operatively coupled with the sports tube via a plurality of fasteners at the second angle relative a horizontal transverse plane of the sports tube along the longitudinal axis of the motor vehicle.

16. The roof rail assembly of claim 12, wherein the roof rail further comprises a padding disposed above the upper edge of the roof rail trim cover and extending along the longitudinal axis of the motor vehicle.

17. The roof rail assembly of claim 12, wherein the sports tube is fabricated from a metal material.

* * * * *